United States Patent [19]

Mojden et al.

[11] Patent Number: 5,669,482
[45] Date of Patent: Sep. 23, 1997

[54] TRAILING END AIR HOLD-UP ASSEMBLY

[75] Inventors: Andrew E. Mojden, Hinsdale; Paul M. Ross, Riverside, both of Ill.

[73] Assignee: Fleetwood Systems, Inc., Romeoville, Ill.

[21] Appl. No.: 541,612

[22] Filed: Oct. 10, 1995

[51] Int. Cl.[6] .................................... B65G 47/22
[52] U.S. Cl. ................. 198/380; 198/495; 414/798.7; 414/903; 53/532
[58] Field of Search ........................ 414/798.7, 786, 414/903, 907; 198/380, 493, 495, 462.1, 462.3; 53/532, 542, 254; 406/88

[56] References Cited

U.S. PATENT DOCUMENTS

| | | |
|---|---|---|
| 2,772,792 | 7/1956 | Lakso . |
| 3,337,064 | 8/1967 | Mojden et al. ............ 414/798.5 |
| 3,971,189 | 7/1976 | Mojden et al. ............ 53/63 |
| 4,053,066 | 10/1977 | Lynch . |
| 4,391,560 | 7/1983 | Fardin ..................... 198/462.1 |
| 4,417,435 | 11/1983 | Wakamatsu et al. ........ 414/786 |
| 4,742,669 | 5/1988 | Mojden ................... 53/500 |
| 4,861,225 | 8/1989 | Dorner et al. ............ 414/798.7 |
| 5,222,840 | 6/1993 | Ingraham et al. ......... 406/88 |
| 5,318,166 | 6/1994 | Mojden et al. ............ 198/453 |
| 5,466,096 | 11/1995 | Hilbish et al. ........... 406/88 |

FOREIGN PATENT DOCUMENTS

| | | |
|---|---|---|
| 177411 | 12/1961 | Sweden . |
| 2081665 | 2/1982 | United Kingdom . |

Primary Examiner—Karen B. Merritt
Assistant Examiner—Douglas Hess
Attorney, Agent, or Firm—Trexler, Bushnell, Giangiorgi & Blackstone, Ltd.

[57] ABSTRACT

An article hold-up assembly for use with an article handling apparatus to maintain at least one article defining a trailing end of a group of articles in an abutting orientation with a group as the group is moved by a conveyor along an elongated lane. The article handling apparatus includes an elongated lane defining an axis of elongation for merging a finite series of articles defining a group of articles with a generally continuous series of articles defining an outfeed stream of articles. The article handling apparatus includes a conveyor for moving articles through at least a portion of the lane. The article hold-up assembly includes an air supply device, a plenum chamber communicating with the air supply device, and a plurality of apertures in the plenum chamber. The air supply device provides positive air flow into the plenum chamber. The plenum chamber and the apertures therein are positioned spaced away from the axis of elongation. The air flowing from the air supply device to the plenum chamber and through the apertures creates a directional air flow against a trailing end article of the group of articles. The directional air flow maintains at least one article which defines the trailing end of the group of articles in an abutting orientation with the group of articles as the group of articles is moved by the conveyor along the elongated lane.

20 Claims, 4 Drawing Sheets

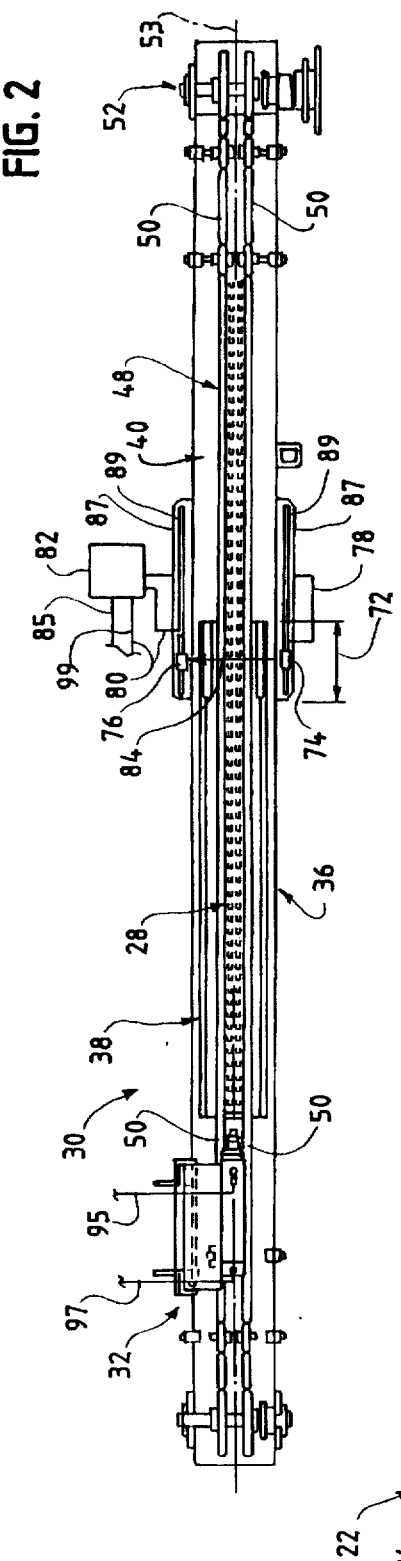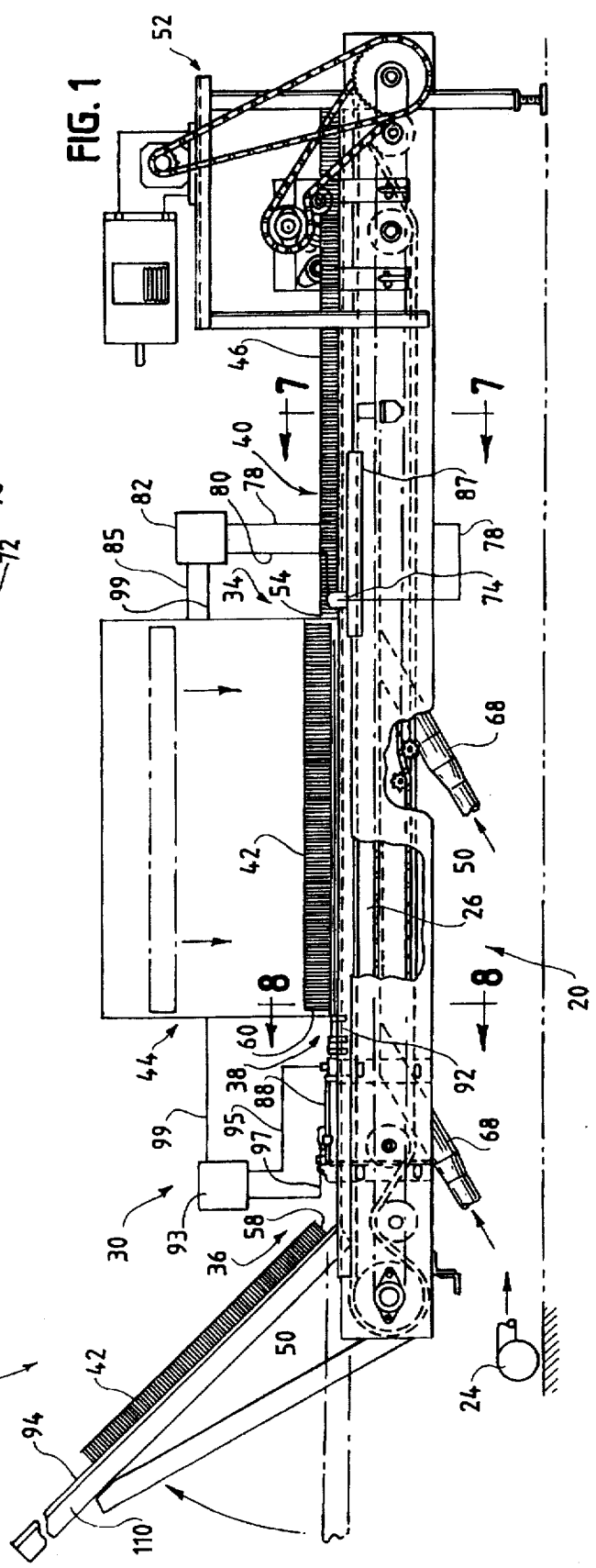

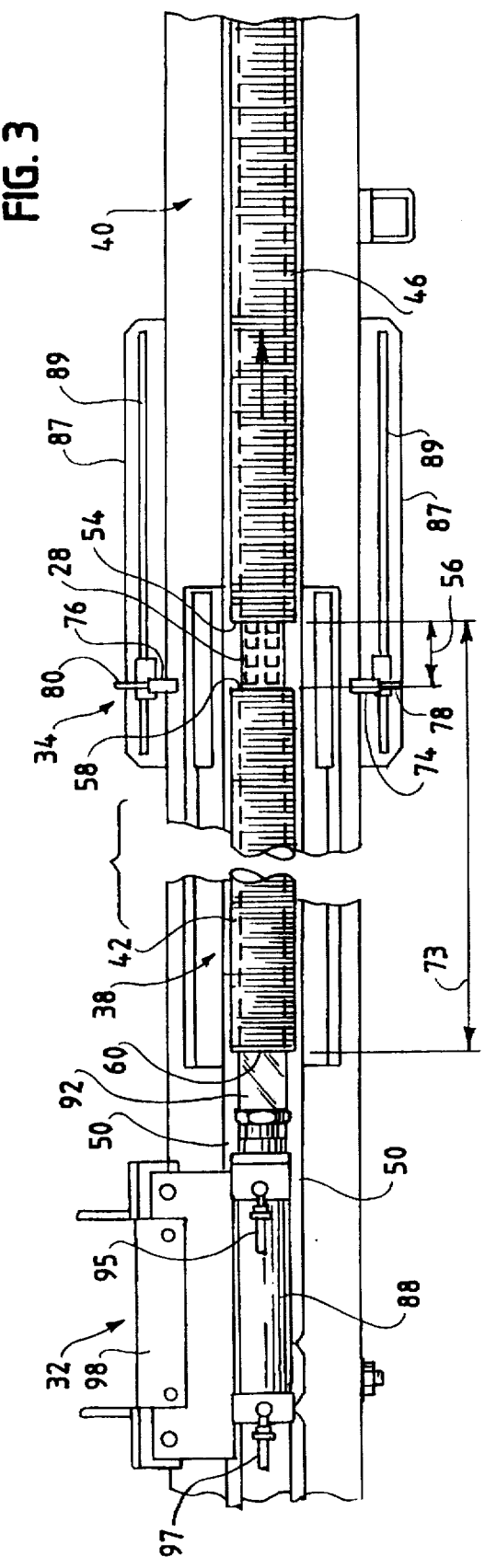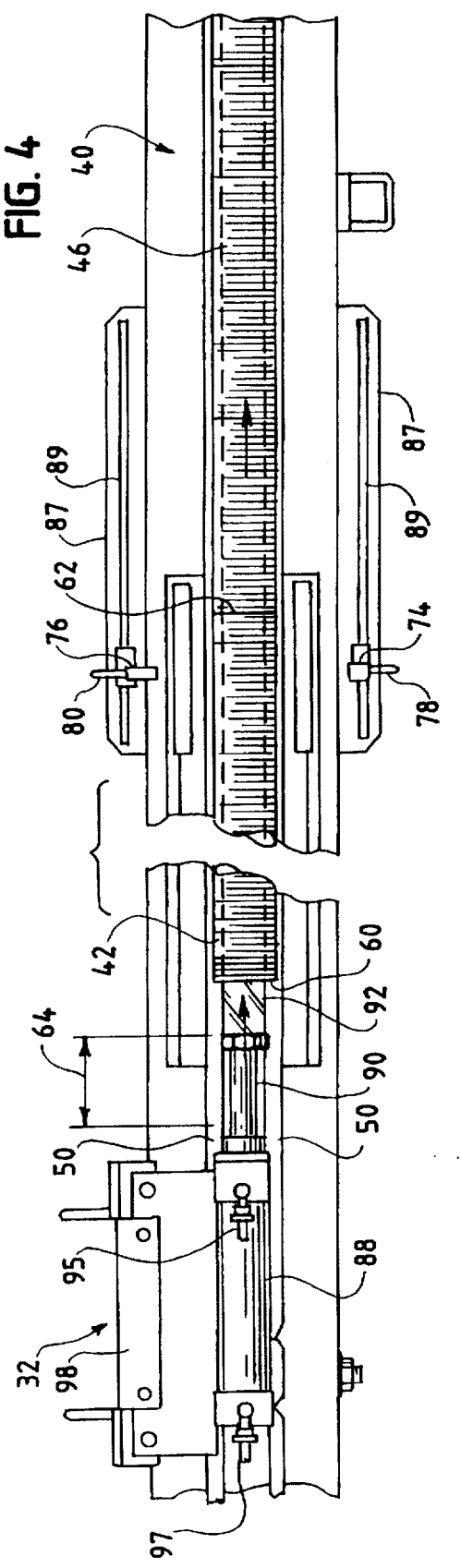

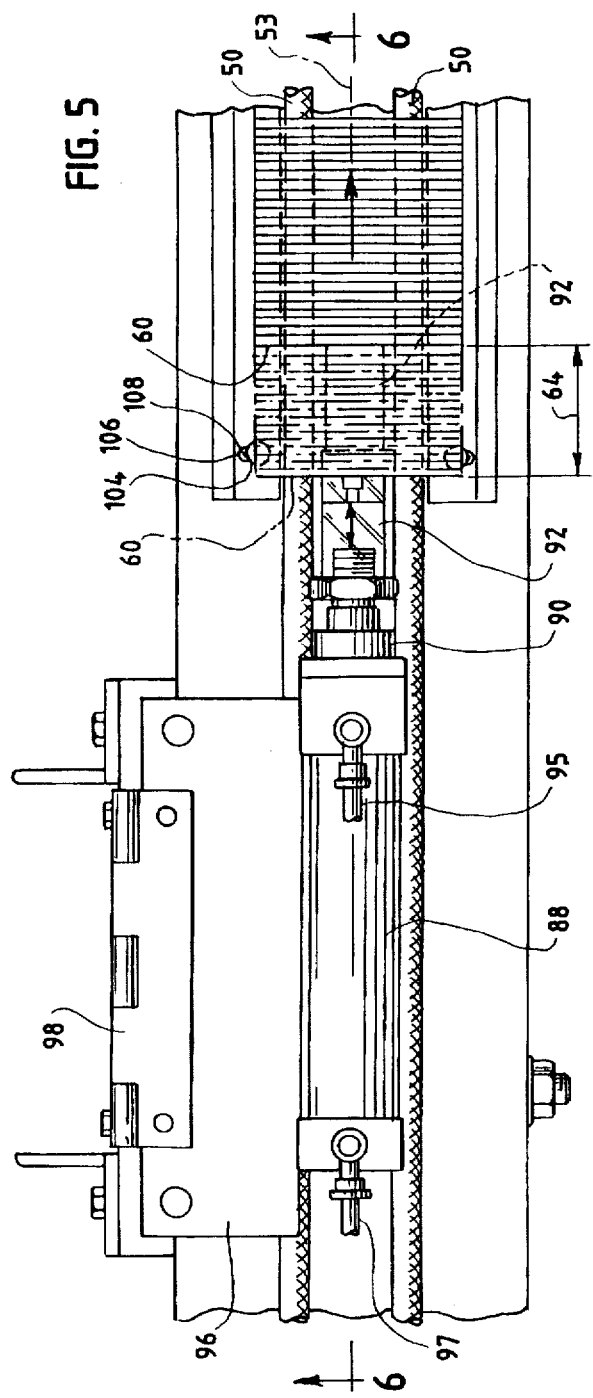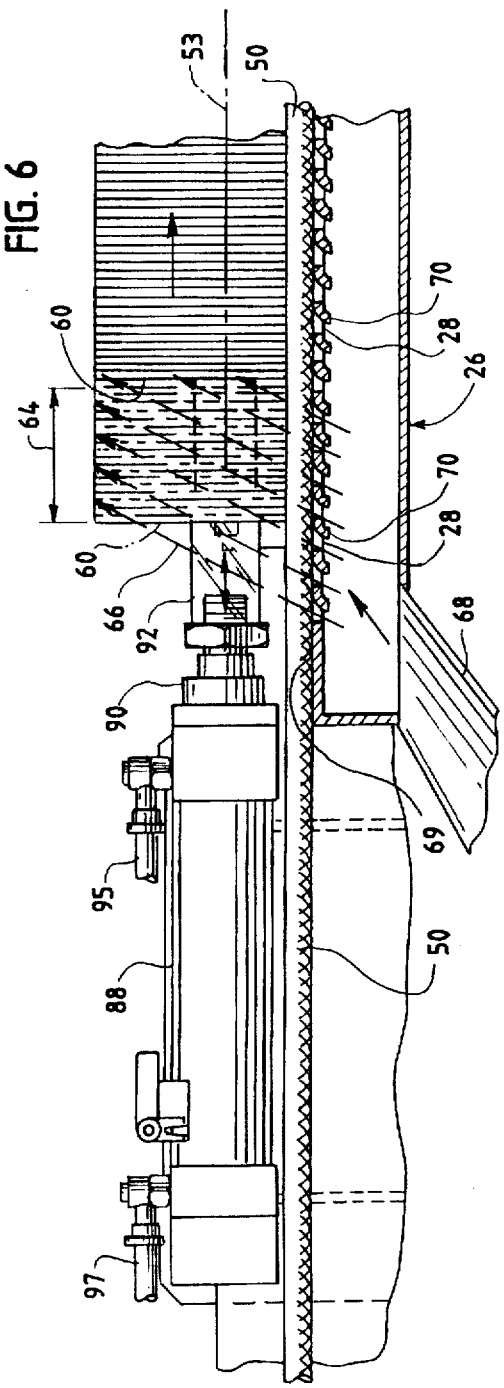

TRAILING END AIR HOLD-UP ASSEMBLY

BACKGROUND

The present invention relates to an article handling apparatus. More particularly, the present invention relates to a novel article handling apparatus which receives and moves a group of stacked articles and maintains a trailing end of the group of articles in a generally abutting position once the group of articles has been merged with an outflow stream of articles.

While the apparatus of the present invention may find utility in other applications, the disclosure will make particular reference to the handling of container ends during fabrication operations as well as subsequent use of such container ends during packaging operations. In the manufacture and filling of containers, for example beverage containers, vast numbers of container ends are required. Present fabrication and filling operations require handling vast numbers of container ends at a high rate of speed in a more or less continuous process. A fabrication or filling facility contain several lines of can ends streaming to or from various processing steps.

Many fabrication steps are involved in the can end fabrication process including stamping or forming, conversion by which the stamped blank is formed into a can end, and, perhaps, application of a pull tab. Additionally, a suitable liner material or coating may be required depending on the type of product which is to be retained in the container. If a liner material or coating is used, a repair may have to be effected to seal any nicks or scrapes which may be encountered during the fabrication process. A final step of the fabrication process may involve placing a predetermined number of container ends in a suitable bag or tray.

The filling operation may also involve numerous steps. Initially, the container ends are transported from the fabrication line or from the bag or tray in which they are stored after the fabrication operation. It should be noted that container ends are often fabricated by one entity (the fabricator) for use by a second entity (the end user). In some instances, the fabricator of such container ends may also be the end user. When the fabricator is also the end user, the process operates in a more less continuous process starting with a raw sheet material which is fabricated, as described hereinabove to form a container end. The container end is then applied to a container after filling.

When the end user is not the fabricator, the end user receives quantities of trays containing groups of container ends or bags of groups of container ends. The groups of container ends are commonly referred to as "sticks of ends" and this term will be used throughout the rest of the description of the present invention. The sticks are removed from the trays or bags and integrated into a stream of ends which flow to the processing station following filling of the corresponding containers.

Throughout the fabrication and processing operations, the stream of ends may encounter problems. For instance, if one of the machines downstream becomes damaged or is taken off line for repairs or servicing, the upstream machines must be shutdown to prevent a backup of the stream of ends. Alternatively, the upstream machines may continue their corresponding processes with the stream of ends flowing therefrom being accumulated in an accumulating or diverting device. In this regard, numerous sticks of ends may accumulate without having to shutdown or stop operation of the upstream machines. Once the downstream machines are back online, the accumulator or diverter releases the accumulated sticks of ends for integration into the processing streams.

Another way of using accumulators or diverters is to manage asymmetric flows between various machines, for example, if a shell press which produces container end blanks can produce six lanes of can end blanks, and a liner downstream therefrom can only receive two incoming lanes, a diverter may be placed therebetween in order to manage the flow. In this regard, the six lanes are accumulated in the accumulator/diverter and managed by this apparatus to produce an output of two lanes. The flow rates of the machines on either side of the diverter may be controlled so that the flow is more or less continuous. Based on the foregoing discussion, it should be clear that numerous variations of such flow management may be contrived.

At this point in the discussion of the background, it is important to consider how the sticks of ends are dispensed from a diverter or accumulator and integrated or merged into the continuous outflow stream of ends. Prior art devices have overcome this problem by providing a variety of mechanical devices for advancing sticks of ends. The mechanical devices receive these sticks of ends and then grip or otherwise hold the sticks of ends. The mechanical device is then operated to slide or otherwise move the sticks of ends along an elongated lane or trough until it is merged with the outflow stream of ends. Once the leading end of the stick of end is merged with the trailing end of the outflow stream of ends, a mechanical arm or other structure is used to apply a force to the trailing end of the stick of ends to hold the merged stick of ends in position. Such mechanical devices may also include a linkage such that the arm holding up the trailing end of the merged stick of end is displaced once a new stick of end is brought into position.

U.S. Pat. No. 5,318,166 to Mojden et al. shows an air hold-up assembly for a stick of can ends. Mojden '166 was invented by, at least in part, the same inventor as the present invention and is assigned to the Assignee of the present invention. In Mojden '166, air is driven against a leading end of a group of articles. The trading end of Mojden '166 is held up by a pushing mechanism which shuttles back and forth along the lane. The device as shown in Mojden '166 does not resolve the problems of retaining the trailing end in a stacked position after the group of articles has been integrated into an outflow stream. The positioning of the trailing end hold-up mechanism in Mojden '166 may interfere with maintaining the receiving station in an empty condition once the group of ends has been sufficiently advanced away from the receiving station to receive a subsequent group of ends.

Further, while such mechanical devices are useful in merging sticks of ends with outflow stream of ends, there is a need to improve such devices. In particular, it is important to minimize the amount of machinery and mechanical devices and physical contact involved in such operations. By minimizing the amount of machinery and physical contact, greater economies both in economic savings as well as time savings can be achieved. These savings are achieved by the reduced maintenance time and downtime as a result of the simplified operation. Further, fewer spare parts need to be available. These changes may increase the reliability of such a processing operations which may further improve the economics of the processing operation. Further, of critical importance, is the need to make sure that the process is operating more less continuously, around-the-clock.

OBJECTS AND SUMMARY

A general object satisfied by the present invention is to provide an apparatus for merging groups or sticks of ends with an outflow stream of ends.

A further object satisfied by the claimed invention is to provide an apparatus for merging groups or sticks of ends with an outflow stream of ends and which retain a trailing end of the sticks of ends in an upright condition.

Yet a further object satisfied by the claimed invention is to provide an apparatus which includes a sensing assembly to provide a sensory signal indicating when a subsequent group or sticks of ends may be placed in a receiving station for integration with an outflow stream of ends.

Still a further object satisfied by the claimed invention is to provide an apparatus for integrating groups or sticks of ends with an outflow stream of ends which may be manually fed or automatically fed.

Briefly, and in accordance with the foregoing, the present invention envisions an article hold-up assembly for use with an article handling apparatus. The article handling apparatus includes an elongated lane defining an axis of elongation for merging a finite series of articles defining a group of articles with a generally continuous series of articles defining an outfeed stream of articles. The article handling apparatus includes a conveyor for moving articles through at least a portion of the lane. The article hold-up assembly includes an air supply device, a plenum chamber communicating with the air supply device, and a plurality of apertures in the plenum chamber. The air supply device provides positive air flow into the plenum chamber. The plenum chamber and the apertures therein are positioned spaced away from the axis of elongation. The air flowing from the air supply device to the plenum chamber and through the apertures creates a directional air flow against a trailing end article of the group of articles. The directional air flow maintains at least one article which defines the trailing end of the group of articles in an abutting orientation with the group of articles as the group of articles is moved by the conveyor along the elongated lane.

BRIEF DESCRIPTION OF THE DRAWINGS

The organization and manner of the structure and function of the invention, together with further objects and advantages thereof; may be understood by reference to the following description taken in connection with the accompanying drawings, wherein like reference numerals identify like elements, and in which:

FIG. 1 is a partial fragmentary, cross-sectional, side elevational view of an apparatus which merges or integrates groups or sticks of ends with an outflow stream of ends;

FIG. 2 is a top plan view of the apparatus as shown in FIG. 1 in which a manual bagoff station on the left of the apparatus, a belt driving device on the right hand side of the apparatus, and a stick serving device generally centrally placed in FIG. 1 have been removed in the interest of clarity;

FIG. 3 is an enlarged, partial fragmentary, top plan view of the apparatus as shown in FIG. 2 and in which a group or stick of ends has been placed in a receiving station for merging with an outflow stream of ends;

FIG. 4 is an enlarged, partial fragmentary, top plan view of the apparatus as shown in FIG. 1, similar to that as shown in FIG. 3, in which a pushing device is operated to advance the stick of ends positioned in the receiving station to merge a leading end of the group or stick of ends with a trailing end of the outflow stream of ends;

FIG. 5 is an enlarged, partial fragmentary, plan view of the apparatus as shown in FIGS. 3 and 4 showing the pushing device and a portion of the receiving station illustrating the advancement of the group or stick of ends by the pushing device;

FIG. 6 is a partial fragmentary, cross-sectional side elevational view of the portion of the apparatus as shown in FIG. 5;

DESCRIPTION

Figure 7:
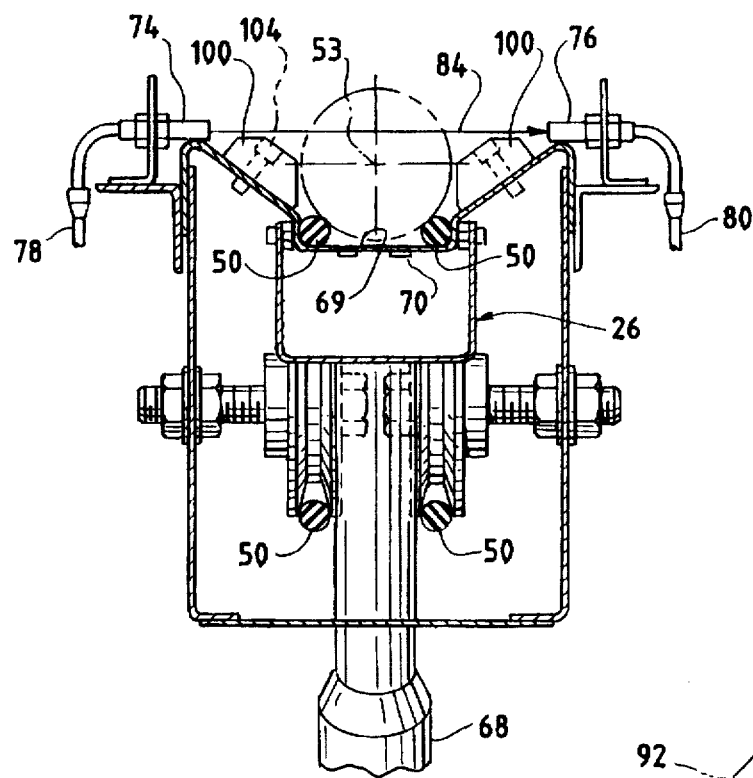
FIG. 7 is an enlarged, partial fragmentary, cross-sectional elevational view taken along line 7—7 in FIG. 1 showing a cross-section through an air plenum chamber, adjustability of guide rails associated with the lane, and the operation of a sensor assembly.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein. Some features shown in the illustrations may have been exaggerated in the interest of clarifying the structures and functions as illustrated herein and in the interest of clearly describing such structures and functions.

With reference to the figures and in particular to FIG. 1, the present invention is an air directing assembly 20 which is used with an article handling apparatus 22. The air directing assembly 20 includes an air supply device 24 which communicates with an air plenum chamber 26 having a number of apertures 28 (shown in greater detail in FIGS. 3, and 5–8). The present invention also includes a trailing end hold-up apparatus 30 which includes the air directing assembly 20. The trailing end hold-up apparatus 30 further includes a pushing device 32 which advances a group of articles and a sensor assembly 34 which senses the movement of articles. While the illustrations as provided herein in FIGS. 1–8 show a single lane of the apparatus 22, it should be understood that multiple apparatus 22 provided with multiple lanes may be used. In this regard, each apparatus or each lane would include the air directing assembly 20, pushing device 32 and sensor assembly 34 in order to achieve the desired article handling results.

FIG. 1 shows the article handling apparatus 22 which includes an elongated lane 36 having a receiving station 38 and an outflow station 40. References made throughout this description to an article handling device 22 which handles articles such as container covers or beverage ends which are arranged in series. The article handling apparatus 22 receives a finite series of articles defining a group or stick of articles or ends 42 from a serving device 44. Groups 42 of articles are deposited from the serving device 44 onto the lane 36 in the receiving station 38. Groups 42 are conveyed from the receiving station 38 to the outfeed station 40 during which they are merged with a generally continuous series of articles defining an outflow stream of articles or ends 46.

Groups of articles 42 handled by the serving device 44 are being introduced into the process flow or have been accumulated or diverted by the serving device 44. For example, the serving device 44 could include an end handling lane diverter such as is produced by Preferred Machining Corporation of Englewood, Colo. The Preferred Machining Corporation end handling lane diverter (the "Preferred end handler") receives groups or sticks of ends from one or more infeed lane and then accumulates or holds the sticks of ends until an appropriate time. At the appropriate time, the sticks of ends are discharged into one or more lanes for integration or merging into the process flow of the one or more lanes. As the sticks are dispensed from such a serving device 44, they must be handled so that they can be merged with a generally continuous outfeed stream 46 such as is shown in FIG. 1.

The trailing end hold-up apparatus 30 including the air directing assembly 20 is used with the article handling apparatus 22 to reliably and efficiently merge the groups 42 of articles with the outfeed stream 46. A conveyor 48 including a pair of spaced apart drive belts 50 and a belt driving device 52 moves the articles through said lane 36 in a generally coaxial, stacked or nested arrangement. In FIGS. 2–4, most of the belt driving device 52 has been removed in the interest of clarity. The belt driving device is generally of known construction as used in other belt driven lane apparatus. The articles have been removed in order to show the surface of the deck 69 and thereby illustrate the apertures 28 formed in the deck 69.

The conveyor 48 provides a positive drive to maintain the articles in a close packed orientation generally coaxial with an axis of elongation 53 defined by the elongated lane 36. In the outfeed station 40, the outfeed stream 46 is positively engaged by the belts 50 and therefore held in a generally stacked orientation. Similarly, the majority of the articles in the group 42 deposited by the serving device 44 in the receiving station 38 are retained in a generally upright and aligned orientation as they move from the receiving station 38 to the outfeed station 40.

Generally, with reference to FIG. 1, the serving device 44 is arranged relative to the article handling apparatus 22 to allow the sticks 42 to be deposited onto the receiving station 38 immediately after a trailing end 54 of the outfeed stream 46 has cleared the serving device 44. With reference to FIG. 3, it can be seen that a gap 56 is formed between the trailing end 54 of the outfeed stream 46 and a leading end 58 of the stick which is deposited in the receiving station 38 immediately behind the outfeed stream 46. The gap 56 is preferably, generally smaller than the diameter of one of the can ends and therefore prevents a can end of the leading end 58 from falling out of abutment with the stick of ends 42.

The pushing device 32 is provided to push against a trading end 60 of the stick 42 to advance the leading end 58 of the stick 42 into abutment against the trailing end 54 of the stream 46. When the leading end 58 and trailing end 54 are joined 62 (see, FIG. 4), the stick 42 has been merged with the outfeed stream 46. However, if not for the air directing assembly 20, the trailing end 60 of the merged stick 42 would tend to fall over in the lane. While the pushing device 32 pushes or advances the stick 42, it only extends a limited distance 64 necessary to join 62, the leading end 58 and trailing end 54. As such, the pushing device 32 does not support the trailing end 60 of the merged stick 42 while merged stick 42 and outfitted stream 46 are conveyed out of the lane. As shown in FIG. 6, the air directing assembly 20 provides a directed air flow 66 which impinges on the trailing end 60 of the merged stick 42.

In greater detail, the air directing assembly 20 includes the air supply device 24 which produces positively pressurized air which is delivered through an air delivery duct 68 connected to the air plenum chamber 26. The plenum 26 provides a pressurized chamber which results in jets of air or directed air flow 66 being emitted through the apertures 28. As more clearly shown in FIGS. 5 and 6, the apertures 28 are formed in a deck portion 69 of the plenum chamber 26 by forming lances 70 in the surface of the deck 69. The lances 70 direct the air up through the apertures 28 at a predetermined angle. In this manner, a generally consistent angle of air flow is maintained against the trading end 60 of the stick 42. It should be noted that the air flow 66 is not sufficient to actually move the stick or urge it forwardly along the lane but is of sufficient force to hold up at least one and preferably several articles positioned near and defining the trading end 60 of the stick 42.

As the stick 42, which has been integrated or merged with the stream 46, is advanced, it approaches a transition area 72 (see FIGS. 1 and 2). In the transition area 72, the stick 42 essentially becomes the end of the stream 46 and a sufficient interval 73 (see FIG. 3) is provided in the receiving area 38 for receiving a subsequent stick 42. It is in this transition area 72 that the sensor assembly 34 is positioned.

The sensor assembly 34 is shown generally in FIGS. 1–4 and with greater detail in FIG. 7. The sensor assembly 34 includes an emitter 74 and a receiver 76. The emitter and receiver 74, 76 are connected via control lines 78, 80 to a controller 82. Referring to FIG. 7, the emitter 74 emits a signal or beam path 84 generally perpendicular and transverse to the axis of elongation 53.

As a stick 42 of ends is advanced toward the outfeed station 40, it will block the beam path 84 as shown in FIG. 7. After the trailing end 60, 54 passes the emitter and receiver pair 74, 76, the beam 84 is allowed to pass from the emitter to the receiver 74,76 thereby producing a signal indicative of the passing of the trading end. The signal is received by the controller 82 which is coupled to the emitter and receiver 74,76 which utilizes the signal to further operate the article handling apparatus 22. The controller 82 is also coupled to the serving device 44 over line 85. The emitter and receiver 74, 76 are mounted on an adjustment structure 87 which has an elongated slot to allow the emitter and receiver 74, 76 to be selectively moved toward and away from the receiving station 38.

Further operations of the article handling apparatus 22 may include depositing a subsequent stick 42 from the serving device 44 into the receiving station 38. Also, the signal from the controller 82 may be compared to other signals from other devices such as the serving device 44 to provide information which, when combined with the signal from the sensor assembly 34 may dictate other operations within the article handling apparatus 22. Further, the signal from the sensor assembly 34 may be compared to a timeout signal which is initiated once the trailing end is sensed. For example, once the trailing end is sensed and the time-out period is initiated, if the next trailing end is not sensed, the system may produce a signal which requires investigation of the outfeed station 40. For example, if a trailing end 54 is sensed and a subsequent stick 42 is deposited, as long as the stream 46 is moving at a predictable rate, the subsequent end 60 should be sensed after a predetermined period of time. The signal can be compared to a range of expected times for conveying of a stick of ends 42 along the lane 36. Failure to sense the subsequent trailing end 60 within such a predetermined period of time would indicate a condition which should be checked such as blockage within the receiving station 38.

Figure 8:
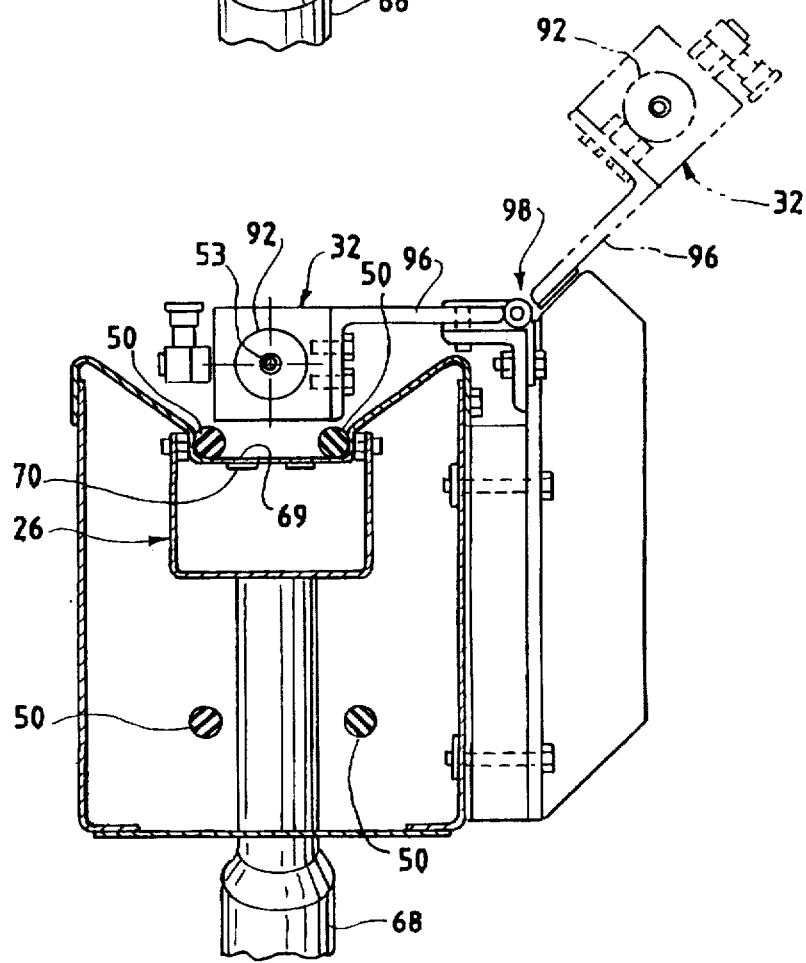
FIG. 8 is an enlarged, cross-sectional, elevational view taken along line 8—8 in FIG. 1 showing the position of the pushing device and the pivoting of the pushing device out of the lane (as shown in phantom line).

The pushing device 32 works in conjunction with the serving device 44 to advance the stick 42 deposited into the receiving area 38. The advancing dimension 64 which is approximately equal to or slightly greater than the gap 56 in order to close the gap 56 and merge the stick 42 with the stream 46. The pushing device 32 includes a controllable air cylinder 88 having a piston 90 and a pusher head 92 attached to a distal end thereof. The piston 90 is extended and retracted generally coaxially with the axis of elongation 53 with the pusher head 92 abutting the trailing end 60 of the stick 42. A controller 93 regulates the air flow over air lines 95, 97 to operate the air cylinder 88. The controller 93 is coupled to the controller 82 over line 99 to allow control of the pushing device 32 in response to the conditions sensed by the sensor assembly 34. The axial orientation and alignment of the piston 90 requires that the air cylinder be suspended in the lane. Additionally, it is important to quickly and easily remove the air cylinder 88 from the path in order to service or repair the article handling apparatus 22 or to clear the path for using a manual serving device 94, as will be described hereinbelow. Therefore, the pushing device 32 includes a pivot bracket 96 which is attached to the article handling apparatus 22 by a hinge 98. With reference to FIG. 8, the pushing device 32 is shown with the air cylinder 88 positioned in the lane 36 for driving a stick 42 along the lane 36. A phantom line illustration is also shown in FIG. 8 showing the position to which the pushing device 32 is pivoted when it is removed from the lane 36.

With reference to FIGS. 5 and 7, the present invention also includes guide rails 100 which are positioned generally parallel to and spaced away from the axis of elongation 53. The guide rails 100 are attached to support structures 102 by means of an adjustable fastener 104. The fastener 104 is inserted through a pair of elongated apertures 106,108 with a dimension of the aperture 106 being greater than the aperture 108 to allow the fastener 104 to be countersunk therein. The elongated apertures 106,108 allow the rail 100 to be adjustable along the support structure 102. Adjustment of the rails 100 allow for a range of article diameters to be moved through the lane 36.

The rails 100 are positioned in the receiving station 38 to facilitate secure reception of a stick 42 therebetween. It should be noted that the stick of ends 42 is a stacked or facewise arranged series of ends without a bag or other structure holding the ends in a stick form. As the sticks 42 are deposited from the serving device 44 into the receiving station 38, it is important that the sticks be maintained in their generally upright, facewise orientation. The rails 100 facilitate the capture and settling of the stick 42 into the receiving station 38 on the corresponding portion of the conveyor belts 50. Once the stick 42 is advanced by the pushing device 32, a degree of compression or support is provided by the adjoining articles.

As an additional matter, the apparatus 22 includes a manual serving device 94. In the event that an automatic serving device 44 is no longer operational, the manual serving device 94 may be employed to deliver sticks of ends 42 to the receiving station 38. Sticks of ends 42 are deposited onto although 110 of the manual serving device 94 which is generally oriented in a horizontal position and generally coaxial with the axis of elongation 53. The trough 110 is pivoted upwardly providing an incline to facilitate movement of a stick of ends placed therein into the receiving station 38. The sticks of ends can be manually moved along the lane 38 until the leading end 58 of the stick 42 is abutted against the trailing end 54 of the stream 46. This feature helps provide increased flexibility of the present apparatus 22 such that if the system or devices upstream of the receiving station 38 are inoperational or removed from operation, sticks of ends 42 can still be deposited onto the lane 36, albeit manually, to maintain the outflow stream 46.

In use, the method of the present invention includes providing an article handling apparatus 22 for maintaining a trailing end article 60 of a group of articles or a stick 42 in abutting orientation when the stick 42 is moved along the lane 36. The method includes the steps of receiving the stick 42 in the lane 36 conveying the stick 42 through the lane and providing a plurality of air jets 66 from the air directing assembly 20 to impinge against the trading end 60 of the stick 42 for maintaining the trailing end 60 in an abutting relationship with the stick 42.

As noted above, the stick 42 is delivered from either an automatic serving device 44 or a manual serving device 94. Once the stick 42 is positioned in the lane 36 and more specifically in the receiving station 38, the stick 42 is conveyed on the belts 50 towards the outfeed station 40. When the automatic serving device 44 is employed, the stick 42 is deposited into the receiving station 38 whereupon the pusher head 92 of the pusher device 32 is driven into abutment against the trailing end 60 to drive the leading end 58 of the stick 42 into abutment against the trailing end 52 of the stream of ends 46.

After advancing the stick of ends 42 along the lane 36, the piston 90 is retracted by the air cylinder 88 to disengage the pusher head 92 from the trailing end 60. The apertures 28 in the deck 69 of the air plenum chamber 26 provide an upwardly directed jet or air flow 66 against the trailing end 60. This air flow 66 is directed as a result of the lances 70 which are angled at a desired angle to provide a predetermined orientation for the airflow. The airflow 66 maintains the articles near the trailing end 60 in an upright orientation as the conveyor 48 moves the stick 42, which is now merged with the stream 46 towards the outfeed station 40.

When the sensor assembly 34 senses a predetermined condition, a subsequent stick 42 is dispensed into the receiving station 38. The trading end 60 of the previous stick is maintained in an upright condition until the pusher device 32 advances the stick 42 along the lane 36 so that the leading end of the subsequent stick 42 is placed in abutment against the trailing end 54 of the stream 46. As such, sticks of ends 42 may be automatically merged into an outfeed stream 46 in a generally continuous, automated process.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. An article hold-up assembly for use with an article handling apparatus having an elongated lane defining an axis of elongation for merging a finite series of articles defining a group of articles with a generally continuous series of articles defining an outfeed stream, said article handling apparatus having a conveyor for moving said group of articles and a portion of said generally continuous series of articles through at least a portion of said lane, said article hold-up assembly comprising:

an air supply device providing positive air flow;

a plenum chamber communicating with said air supply, said plenum chamber being positioned spaced away from said axis of elongation; and a plurality of apertures in said plenum chamber said apertures in said plenum chamber being arranged for emitting a directional, generally angular air flow against a trailing end of said group of articles for maintaining at least one article defining said trailing end of said group of articles in an abutting orientation with said group of articles as said group of articles is moved by said conveyor along said elongated lane.

2. An article hold-up assembly as recited in claim 1, wherein said plenum chamber is positioned in said elongated lane below said group of articles for emitting said directional air flow upwardly against a trailing end of said group of articles for maintaining at least one article defining said trailing end of said group of articles in an abutting orientation with said group of articles as said group of articles is moved by said conveyor along said elongated lane.

3. An article hold-up assembly as recited in claim 1, wherein said article handling apparatus comprises a moving belt conveyor having two generally parallel belts positioned in said lane generally parallel to and spaced away from said axis of elongation, said article hold-up apparatus having said apertures in said plenum chamber being positioned between said belts.

4. An article handling apparatus for merging a finite series of articles defining a group of articles with a generally continuous series of articles defining an outfeed stream of articles, said apparatus comprising:

a generally elongated lane defining an axis of elongation;

an outfeed station at one end of said elongated lane, said outfeed stream of articles extending through said outfeed station;

a receiving station disposed in said elongated lane for receiving a group of articles, said receiving station communicating with said outfeed station;

a conveyor positioned in said lane extending at least partially through said receiving station and at least partially through said outfeed station for moving said group of articles in said receiving station and said outfeed stream of articles in said outfeed station along said elongated lane; and an article hold-up assembly positioned in said elongated lane, an air directing structure of said article hold-up assembly emitting directional air flow from a position spaced away from said axis of elongation against a trailing end of said group of articles for maintaining at least one article defining said trailing end of said group of articles in an abutting orientation with said group of articles as said group of articles is moved by said conveyor along said elongated lane.

5. An article handling apparatus for merging a finite series of articles defining a group with a generally continuous series of articles defining an outfeed stream of articles as recited in claim 4, further comprising:

a pusher device for axially displacing said group of articles in said receiving station for merging a leading end of said group of articles with a trading end of said outfeed stream of articles.

6. An article handling apparatus for merging a finite series of articles defining a group with a generally continuous series of articles defining an outfeed stream of articles as recited in claim 5, wherein said pusher device includes a pivot structure attached to said article handling apparatus for positioning said pusher device in said lane generally axially aligned with said axis of elongation and said pivot structure selectively pivoting said pusher device out of said lane.

7. An article handling apparatus for merging a finite series of articles defining a group with a generally continuous series of articles defining an outfeed stream of articles as recited in claim 4, wherein said air directing structure of said article hold-up assembly is positioned in said elongated lane below said group of articles in said receiving station for emitting said directional air flow upwardly against a trailing end of said group of articles for maintaining at least one article defining said trailing end of said group of articles in an abutting orientation with said group of articles as said group of articles is moved by said conveyor along said elongated lane.

8. An article handling apparatus for merging a finite series of articles defining a group with a generally continuous series of articles defining an outfeed stream of articles as recited in claim 4, further comprising:

said air directing structure of said article hold-up assembly being positioned in said elongated lane forming a deck of said receiving station; and said deck having a plurality of apertures, said apertures being arranged for producing a directional, generally angular air flow.

9. An article handling apparatus for merging a finite series of articles defining a group with a generally continuous series of articles defining an outfeed stream of articles as recited in claim 8, wherein said deck air is positioned in said elongated lane below said group of articles in said receiving station, said apertures in said deck being arranged for emitting said directional air flow upwardly against a trading end of said group of articles for maintaining at least one article defining said trailing end of said group of articles in an abutting orientation with said group of articles as said group of articles is moved by said conveyor along said elongated lane.

10. An article handling apparatus for merging a finite series of articles defining a group with a generally continuous series of articles defining an outfeed stream of articles as recited in claim 4, said air hold-up assembly further comprising:

an air supply device for providing positive air flow;

an elongated plenum chamber communicating with said air supply device and juxtaposed relative to said elongated lane; and said elongated plenum chamber having a plurality of apertures therein, said apertures being arranged for producing a directional, generally angular air flow.

11. An article handling apparatus for merging a finite series of articles defining a group with a generally continuous series of articles defining an outfeed stream of articles as recited in claim 10, wherein said elongated plenum chamber is positioned in said elongated lane below said group of articles in said receiving station, said apertures in said plenum chamber being arranged for emitting said directional air flow upwardly against a trading end of said group of articles for maintaining at least one article defining said trailing end of said group of articles in an abutting orientation with said group of articles as said group of articles is moved by said conveyor along said elongated lane.

12. An article handling apparatus for merging a finite series of articles defining a group with a generally continuous series of articles defining an outfeed stream of articles as recited in claim 4, said conveyor further comprising:

a moving belt conveyor having at least one belt moving in said lane generally parallel to and spaced away from said axis of elongation.

13. An article handling apparatus for merging a finite series of articles defining a group with a generally continuous series of articles defining an outfeed stream of articles as recited in claim 4, further comprising:

a sensor assembly having at least one sensor device positioned relative to said elongated lane for detecting a selected portion of at least one of said outfeed stream of articles and said group of articles and providing a signal indicative of said selected portion; and a controller for controlling said article handling apparatus, said at least one sensor device being coupled to said controller for providing said signal to said controller to indicate that said receiving station is clear to receive a subsequent group of articles.

14. An article handling apparatus for merging a finite series of articles defining a group with a generally continuous series of articles defining an outfeed stream as recited in claim 13, said sensor assembly further comprising:

an adjusting structure for selectively positioning said at least one sensor relative to said selected portion of said group of articles to accommodate variations associated with said group of articles and said outfeed stream of articles.

15. An article handling apparatus for merging a finite series of articles defining a group with a generally continuous series of articles defining an outfeed stream of articles as recited in claim 4, further comprising:

support rails positioned in said elongated lane in at least a portion of said receiving area for guiding said group of articles from said receiving area.

16. An article handling apparatus for merging a finite series of articles defining a group with a generally continuous series of articles defining an outfeed stream of articles as recited in claim 15, wherein said support rails are axially adjustable relative to said axis of elongation for accommodating articles having a range of dimensions.

17. An article handling apparatus for merging a finite series of articles defining a group with a generally continuous series of articles defining an outfeed stream of articles, said apparatus comprising:

a generally elongated lane defining an axis of elongation;

an outfeed station at one end of said elongated lane, said outfeed stream of articles extending though said outfeed station;

a receiving station disposed in said lane for receiving a group of articles, said receiving station communicating with said outfeed station;

a moving belt conveyor having at least one belt positioned in said lane generally parallel to and spaced away from said axis of elongation, said belt extending at least partially through said receiving station and at least partially through said outfeed station for moving said group of articles in said receiving station and said outfeed stream in said outfeed station along said elongated lane; and an article hold-up assembly including an air supply device, a plenum chamber communicating with said air supply and a plurality of apertures in said plenum chamber, said air supply device providing positive air flow to said plenum chamber which is positioned spaced away from said axis of elongation, and below said group of articles in at least a portion of said receiving station, said apertures in said plenum chamber being arranged for emitting a directional, generally angular air flow against a trailing end of said group of articles for maintaining at least one article defining said trailing end of said group of articles in an abutting orientation with said group of articles as said group of articles is moved by said moving belt conveyor along said elongated lane.

18. An article handling apparatus for merging a finite series of articles defining a group with a generally continuous series of articles defining an outfeed stream of articles as recited in claim 17, further comprising:

a sensor assembly having at least one sensor device positioned relative to said elongated lane for detecting a selected portion of at least one of said outfeed stream of articles and said group of articles and providing a signal indicative of said selected portion;

a controller for controlling said article handling apparatus, said at least one sensor device being coupled to said controller for providing said signal to said controller to indicate that said receiving station is clear to receive a subsequent group of articles.

19. An article handling apparatus for merging a finite series of articles defining a group with a generally continuous series of articles defining an outfeed stream of articles as recited in claim 17, further comprising:

a pusher device for axially displacing said group of articles in said receiving station for merging a leading end of said group of articles with a trailing end of said outfeed stream of articles, and a pivot structure attached to said article handling apparatus and said pusher device for positioning said pusher device in said lane generally axially aligned with said axis of elongation and selectively pivoting said pusher device out of said lane.

20. An article handling apparatus for merging a finite series of articles defining a group with a generally continuous series of articles defining an outfeed stream of articles as recited in claim 17, further comprising:

support rails positioned in said elongated lane in at least a portion of said receiving area for guiding said group of articles from said receiving area.

* * * * *

UNITED STATES PATENT AND TRADEMARK OFFICE
CERTIFICATE OF CORRECTION

PATENT NO. : 5,669,482
DATED : September 23, 1997
INVENTOR(S) : Andrew E. Mojden and Paul M. Ross It is certified that error appears in the above-indentified patent and that said Letters Patent is hereby corrected as shown below:

Column 2, Line 37 "trading" should be -- trailing --

Column 6, Line 3 "trading" should be --trailing --
Column 6, Line 7 "trading" should be --trailing --
Column 6, Line 28 "trading" should be --trailing --
Column 6, Line 65 "dose" should be --close --
Column 7, Line 52 "although" should be -- a trough--
Column 8, Line 5 "trading" should be -- trailing --
Column 8, Line 32 "trading" should be -- trailing --
Column 9, Line 49 "trading" should be --trailing --
Column 10, Line 19 "trading" should be --trailing --
Column 10, Line 45 "trading" should be -- trailing --

Signed and Sealed this

Twenty-first Day of April, 1998

Attest:

BRUCE LEHMAN

*Attesting Officer*  *Commissioner of Patents and Trademarks*